(12) United States Patent
Oliphant

(10) Patent No.: US 8,266,699 B2
(45) Date of Patent: Sep. 11, 2012

(54) MULTIPLE-PATH REMEDIATION

(75) Inventor: Brett M. Oliphant, Lafayette, IN (US)

(73) Assignee: SecurityProfiling Inc., Lafayette, IN (US)

( * ) Notice: Subject to any disclaimer, the term of this patent is extended or adjusted under 35 U.S.C. 154(b) by 2343 days.

(21) Appl. No.: 10/882,588

(22) Filed: Jul. 1, 2004

(65) Prior Publication Data

US 2005/0044389 A1   Feb. 24, 2005
US 2006/0259779 A2   Nov. 16, 2006
US 2007/0113100 A2   May 17, 2007

Related U.S. Application Data

(60) Provisional application No. 60/484,085, filed on Jul. 1, 2003.

(51) Int. Cl.
    *H04L 29/06*   (2006.01)
(52) U.S. Cl. .................. 726/25; 726/22; 726/23; 726/2; 713/189; 713/187; 713/188; 717/168; 717/169; 717/170; 717/171; 717/172; 709/224; 709/225
(58) Field of Classification Search .......... None
    See application file for complete search history.

(56) References Cited

U.S. PATENT DOCUMENTS

| | | | |
|---|---|---|---|
| 5,335,346 A | 8/1994 | Fabbio | |
| 5,765,153 A | 6/1998 | Benantar et al. | |
| 5,892,903 A | 4/1999 | Klaus | |
| 6,005,942 A * | 12/1999 | Chan et al. | 713/187 |
| 6,044,466 A | 3/2000 | Ananed et al. | |
| 6,298,445 B1 | 10/2001 | Shostack et al. | |
| 6,321,334 B1 | 11/2001 | Jerger et al. | |
| 6,345,361 B1 | 2/2002 | Jerger et al. | |
| 6,473,800 B1 | 10/2002 | Jerger et al. | |
| 6,526,513 B1 | 2/2003 | Shrader et al. | |
| 7,000,247 B2 * | 2/2006 | Banzhof | 726/2 |
| 7,228,566 B2 * | 6/2007 | Caceres et al. | 726/25 |
| 7,278,163 B2 * | 10/2007 | Banzhof et al. | 726/25 |
| 7,308,712 B2 * | 12/2007 | Banzhof | 726/22 |
| 7,315,801 B1 * | 1/2008 | Dowd et al. | 703/13 |
| 7,353,539 B2 * | 4/2008 | Brawn et al. | 726/25 |
| 7,424,706 B2 * | 9/2008 | Ivanov et al. | 717/169 |
| 7,458,098 B2 * | 11/2008 | Judge et al. | 726/23 |
| 7,509,676 B2 * | 3/2009 | Trueba | 726/22 |
| 7,519,954 B1 * | 4/2009 | Beddoe et al. | 717/124 |
| 7,519,994 B2 * | 4/2009 | Judge et al. | 726/22 |
| 7,627,891 B2 * | 12/2009 | Williams et al. | 726/1 |
| 7,673,043 B2 * | 3/2010 | Keir et al. | 709/224 |
| 7,698,275 B2 * | 4/2010 | O'Brien et al. | 707/999.009 |
| 7,761,920 B2 * | 7/2010 | Bezilla et al. | 726/25 |

(Continued)

FOREIGN PATENT DOCUMENTS

JP     2002/366525     12/2002

(Continued)

*Primary Examiner* — Syed A. Zia
(74) *Attorney, Agent, or Firm* — Frost Brown Todd LLC

(57) ABSTRACT

A security information management system is described, wherein a database of potential vulnerabilities is maintained, along with data describing remediation techniques (patches, policy settings, and configuration options) available to protect against them. At least one vulnerability is associated in the database with multiple available remediation techniques. In one embodiment, the system presents a user with the list of remediation techniques available to protect against a known vulnerability, accepts the user's selection from the list, and executes the selected technique. In other embodiments, the system uses a predetermined prioritization schedule to automatically select among the available remediation techniques, then automatically executes the selected technique.

17 Claims, 3 Drawing Sheets

U.S. PATENT DOCUMENTS

| | | |
|---|---|---|
| 7,882,555 B2 * | 2/2011 | Ben-Itzhak ..................... 726/13 |
| 8,135,823 B2 * | 3/2012 | Cole et al. ..................... 709/224 |
| 8,135,830 B2 * | 3/2012 | McClure et al. ............... 709/224 |
| 8,181,173 B2 * | 5/2012 | Childress et al. .............. 717/171 |
| 8,185,930 B2 * | 5/2012 | Alperovitch et al. ............ 726/1 |
| 2001/0034847 A1 | 10/2001 | Gaul, Jr. |
| 2002/0026591 A1 | 2/2002 | Hartley et al. |
| 2002/0104014 A1 | 8/2002 | Zobel et al. |
| 2002/0112179 A1 | 8/2002 | Riordan et al. |
| 2002/0199122 A1 | 12/2002 | Davis et al. |
| 2003/0005178 A1 | 1/2003 | Hemsath |
| 2003/0014669 A1 | 1/2003 | Caceres et al. |
| 2003/0061506 A1 | 3/2003 | Cooper et al. |
| 2003/0084320 A1 | 5/2003 | Tarquini et al. |
| 2003/0126472 A1 * | 7/2003 | Banzhof ..................... 713/201 |
| 2004/0088565 A1 * | 5/2004 | Norman et al. ............... 713/200 |
| 2004/0117640 A1 * | 6/2004 | Chu et al. ..................... 713/188 |
| 2005/0010819 A1 | 1/2005 | Williams et al. |

FOREIGN PATENT DOCUMENTS

| | | |
|---|---|---|
| JP | 2003/037601 | 2/2003 |
| WO | WO 02/14987 | 2/2002 |
| WO | WO 03/007192 | 1/2003 |
| WO | WO 03/029940 | 4/2003 |
| WO | WO 03/029941 | 4/2003 |

* cited by examiner

MULTIPLE-PATH REMEDIATION

CROSS-REFERENCE TO RELATED APPLICATIONS

This application claims the benefit of U.S. Provisional Application No. 60/484,085 filed Jul. 1, 2003. This application is also related to applications titled REAL-TIME VULNERABILITY MONITORING Ser. No. 10/882,852, POLICY-PROTECTION PROXY Ser. No. 10/882,853, VULNERABILITY AND REMEDIATION DATABASE Ser. No. 10/882,788, AUTOMATED STAGED PATCH AND POLICY MANAGEMENT Ser. No. 10/884,329, and CLIENT CAPTURE OF VULNERABILITY DATA Ser. No. 10/883,376, all filed on even date herewith. All of these applications are hereby incorporated herein by reference as if fully set forth.

FIELD OF THE INVENTION

The present invention relates to computer systems, and more particularly to management of security of computing and network devices that are connected to other such devices.

BACKGROUND

With the growing popularity of the Internet and the increasing reliance by individuals and businesses on networked computers, network security management has become a critical function for many people. Furthermore, with computing systems themselves becoming more complex, security vulnerabilities in a product are often discovered long after the product is released into general distribution. Improved methods are needed, therefore, for managing updates and patches to software systems, and for managing configurations of those systems.

The security management problem is still more complex, though. Often techniques intended to remediate vulnerabilities (such as configuration changes, changes to policy settings, or application of patches) add additional problems. Sometimes patches to an operating system or application interfere with operation of other applications, and can inadvertently disable mission-critical services and applications of an enterprise. At other times, remediation steps open other vulnerabilities in software. There is, therefore, a need for improved security management techniques.

SUMMARY

One form of the present invention is a database of information about a plurality of devices, updated in real-time and used by an application to make a security-related decision. The database stores data indicating the installed operating system(s), installed software, patches that have been applied, system policies that are in place, and configuration information for each device. The database answers queries by one or more devices or applications attached by a network to facilitate security-related decision making. In one form of this embodiment, a firewall or router handles a connection request or maintenance of a connection based on the configuration information stored in the database that relates to one or both of the devices involved in the transmission.

DESCRIPTION

Figure 1:
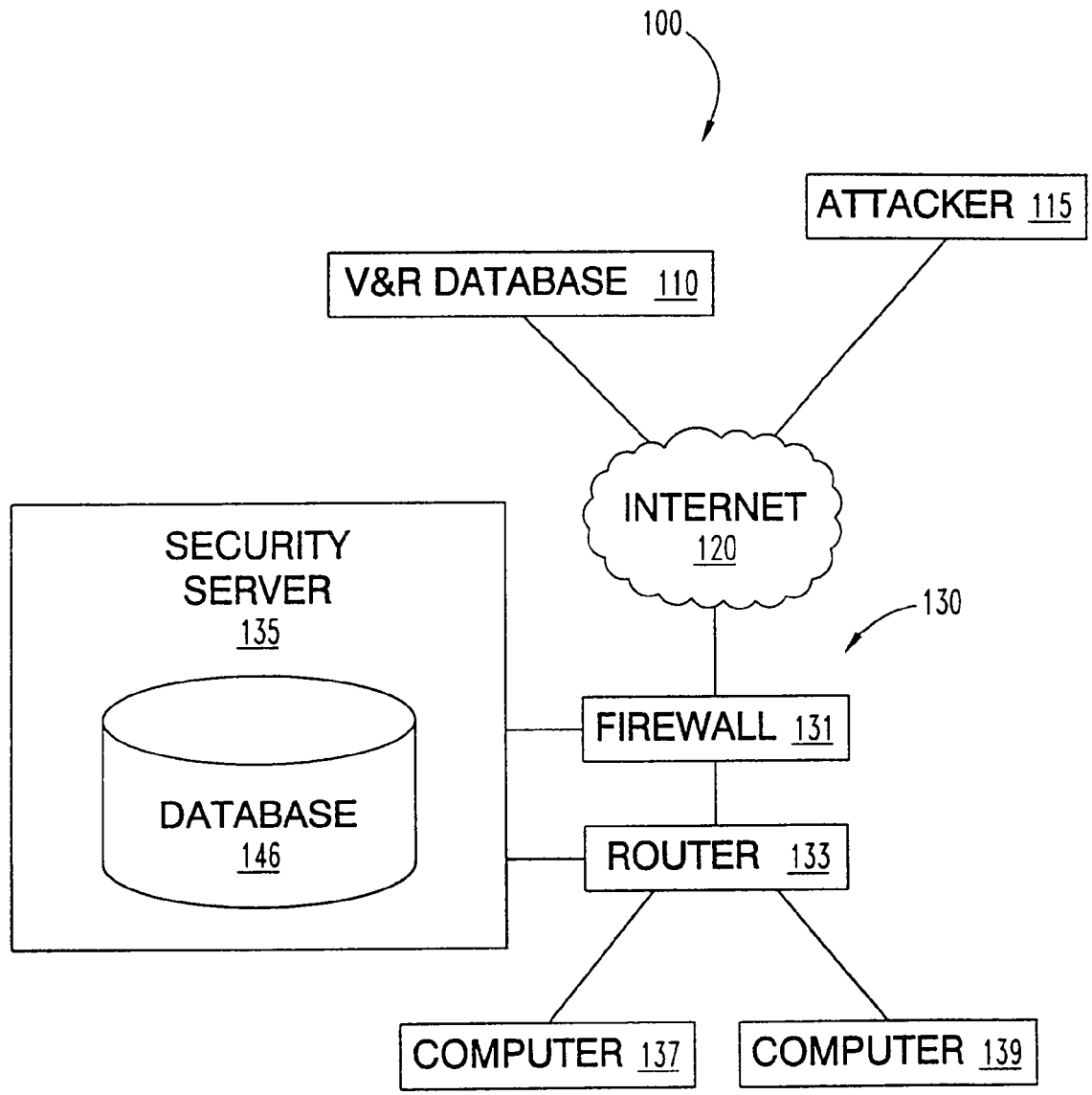
FIG. 1 is a block diagram of a networked system of computers in one embodiment of the present invention.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the present invention in its preferred embodiment operates in the context of a network as shown in FIG. 1. System 100 includes a vulnerability and remediation database 110 connected by Internet 120 to subnet 130. In this exemplary embodiment, firewall 131 serves as the gateway between Internet 120 and the rest of subnet 130. Router 133 directs connections between computers 137 and each other and other devices on Internet 120. Server 135 collects certain information and provides certain data services that will be discussed in further detail herein.

In particular, security server 135 includes processor 142, and memory 144 encoded with programming instructions executable by processor 142 to perform several important security-related functions. For example, security server 135 collects data from devices 131, 133, 137, and 139, including the software installed on those devices, their configuration and policy settings, and patches that have been installed. Security server 135 also obtains from vulnerability and remediation database 110 a regularly updated list of security vulnerabilities in software for a wide variety of operating systems, and even in the operating systems themselves. Security server 135 also downloads a regularly updated list of remediation techniques that can be applied to protect a device from damage due to those vulnerabilities. In a preferred embodiment, each vulnerability in remediation database 110 is identified by a vulnerability identifier, and the vulnerability identifier can be used to retrieve remediation information from database 110 (and from database 146, discussed below in relation to FIG. 2).

In this preferred embodiment, computers 137 and 139 each comprise a processor 152, 162, memory 154, 164, and storage 156, 166. Computer 137 executes a client-side program (stored in storage 156, loaded into memory 154, and executed by processor 152) that maintains an up-to-date collection of information regarding the operating system, service pack (if applicable), software, and patches installed on computer 137, and the policies and configuration data (including configuration files, and elements that may be contained in files, such as *.ini and *.conf files and registry information, for example), and communicates that information on a substantially real-time basis to security server 135. In an alternative embodiment, the collection of information is not retained on computer 137, but is only communicated once to security server 135, then is updated in real time as changes to that collection occur.

In these exemplary systems, "configuration information" for each device may take the form of initialization files (often named *.ini or *.conf), configuration registry (such as the Windows Registry on Microsoft WINDOWS operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

Computer 139 stores, loads, and executes a similar software program that communicates configuration information pertaining to computer 139 to security server 135, also substantially in real time. Changes to the configuration registry in computer 139 are monitored, and selected changes are communicated to security server 135 so that relevant information is always available. Security server 135 may connect directly to and request software installation status and configuration information from firewall 131 and router 133, for embodiments wherein firewall 131 and router 133 do not have a software program executing on them to communicate this information directly.

This collection of information is made available at security server 135, and combined with the vulnerability and remediation data from source 110. The advanced functionality of system 100 is thereby enabled as discussed further herein.

Figure 2:
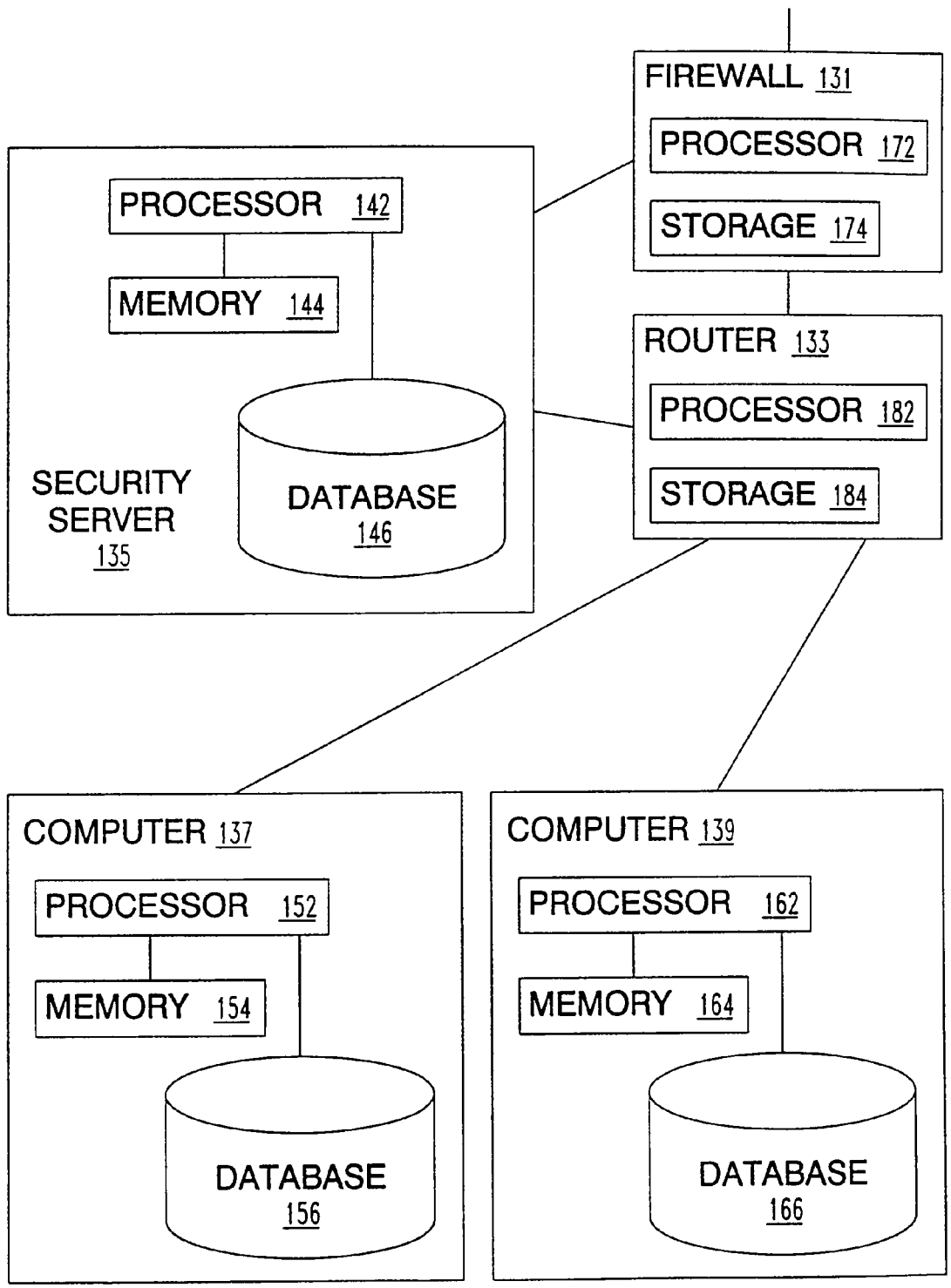
FIG. 2 is a block diagram showing components of several computing devices in the system of FIG. 1.

Turning to FIG. 2, one sees additional details and components of the devices in subnet 130. Computers 137 and 139 are traditional client or server machines, each having a processor 152, 162, memory 154, 164, and storage 156, 166. Firewall 131 and router 133 also have processors 172, 182 and storage 174, 184, respectively, as is known in the art. In this embodiment, devices 137 and 139 each execute a client-side program that continuously monitors the software installation and configuration status for that device. Changes to that status are communicated in substantially real time to security server 135, which continuously maintains the information in database 146. Security server 135 connects directly to firewall 131 and router 133 to obtain software installation and configuration status for those devices in the absence of a client-side program running thereon.

Processors 142, 152, 162 may each be comprised of one or more components configured as a single unit. Alternatively, when of a multi-component form, processor 142, 152, 162 may each have one or more components located remotely relative to the others. One or more components of processor 142, 152, 162 may be of the electronic variety defining digital circuitry, analog circuitry, or both. In one embodiment, processor 142, 152, 162 are of a conventional, integrated circuit microprocessor arrangement, such as one or more PENTIUM 4 or XEON processors from INTEL Corporation of 2200 Mission College Boulevard, Santa Clara, Calif., 95052, USA, or ATHLON XP processors from Advanced Micro Devices, One AMD Place, Sunnyvale, Calif., 94088, USA.

Memories 144, 154, 164 may include one or more types of solid-state electronic memory, magnetic memory, or optical memory, just to name a few. By way of non-limiting example, memory 40b may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard drive, floppy disk, tape, or cartridge media; or a combination of any of these memory types. Also, memories 144, 154, 164 may be volatile, nonvolatile, or a hybrid combination of volatile and nonvolatile varieties.

In this exemplary embodiment, storage 146, 156, 166 comprises one or more of the memory types just given for memories 144, 154, 164, preferably selected from the non-volatile types.

Figure 3:
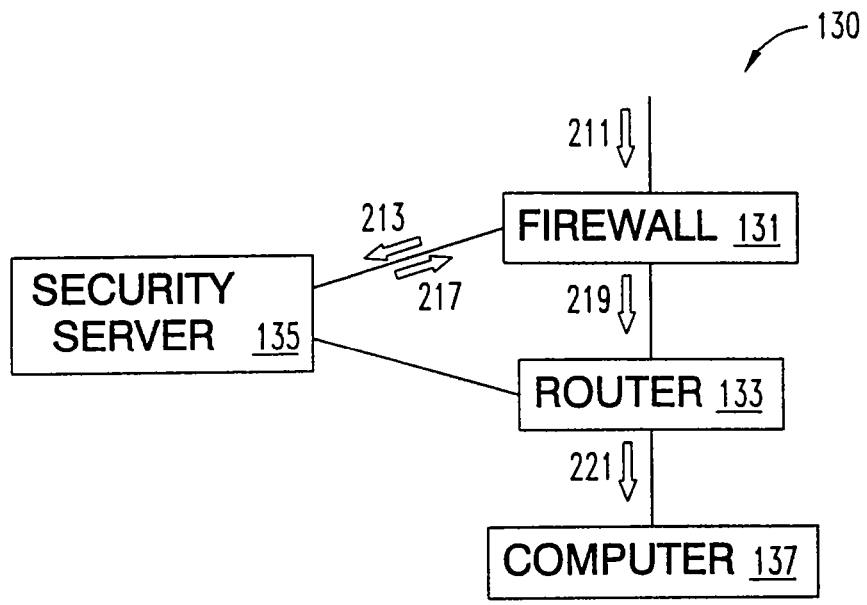
FIGS. 3 and 4 trace signals that travel through the system of FIGS. 1 and 2 and the present invention is applied to them.

This collection of information is used by system 100 in a wide variety of ways. With reference to FIG. 3, assume for example that a connection request 211 arrives at firewall 131 requesting that data be transferred to computer 137. The payload of request 211 is, in this example, a probe request for a worm that takes advantage of a particular security vulnerability in a certain computer operating system. Based on characteristics of the connection request 211, firewall 131 sends a query 213 to security server 135. Query 213 includes information that security server 135 uses to determine (1) the intended destination of connection request 211, and (2) some characterization of the payload of connection request 211, such as a vulnerability identifier. Security server 135 uses this information to determine whether connection request 211 is attempting to take advantage of a particular known vulnerability of destination machine 137, and uses information from database 146 (see FIG. 2) to determine whether the destination computer 137 has the vulnerable software installed, and whether the vulnerability has been patched on computer 137, or whether computer 137 has been configured so as to be invulnerable to a particular attack.

Security server 135 sends result signal 217 back to firewall 131 with an indication of whether the connection request should be granted or rejected. If it is to be granted, firewall 131 passes the request to router 133 as request 219, and router 133 relays the request as request 221 to computer 137, as is understood in the art. If, on the other hand, signal 217 indicates that connection request 211 is to be rejected, firewall 133 drops or rejects the connection request 211 as is understood in the art.

Figure 4:
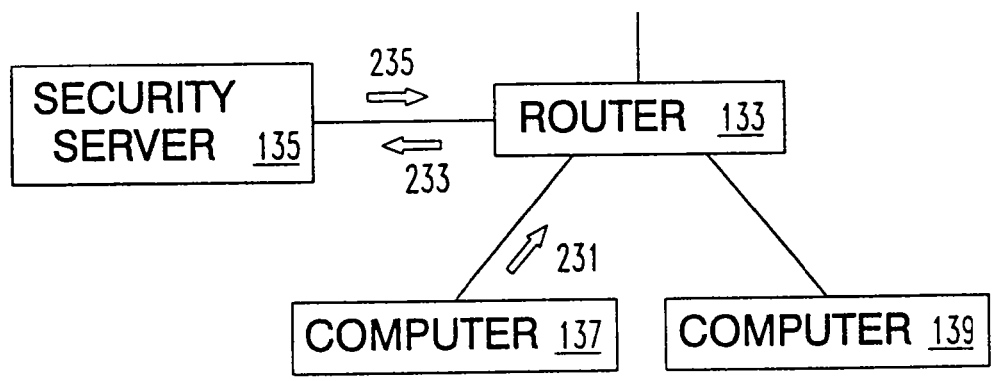

Analogous operation can protect computers within subnet 130 from compromised devices within subnet 130 as well. For example, FIG. 4 illustrates subnet 130 with computer 137 compromised. Under the control of a virus or worm, for example, computer 137 sends connection attempt 231 to router 133 in an attempt to probe or take advantage of a potential vulnerability in computer 139. On receiving connection request 231, router 133 sends relevant information about request 231 in a query 233 to security server 135. Similarly to the operation discussed above in relation to FIG. 3, security server 135 determines whether connection request 231 poses any threat, and in particular any threat to software on computer 139. If so, security server 135 determines whether the vulnerability has been patched, and if not, it determines whether computer 139 has been otherwise configured to avoid damage due to that vulnerability. Security server 135 replies with signal 235 to query 233 with that answer. Router 133 uses response 235 to determine whether to allow the connection attempt.

In some embodiments, upon a determination by security server 135 that a connection attempt or other attack has occurred against a computer that is vulnerable (based on its current software, patch, policy, and configuration status), security server 135 selects one or more remediation techniques from database 146 that remediate the particular vulnerability. Based on a prioritization previously selected by an administrator or the system designer, the remediation technique(s) are applied (1) to the machine that was attacked, (2) to all devices subject to the same vulnerability (based on their real-time software, patch, policy, and configuration status), or (3) to all devices to which the selected remediation can be applied.

In various embodiments, remediation techniques include the closing of open ports on the device; installation of a patch that is known to correct the vulnerability; changing the device's configuration; stopping, disabling, or removing services; setting or modifying policies; and the like. Furthermore, in various embodiments, events and actions are logged (preferably in a non-volatile medium) for later analysis and review by system administrators. In these embodiments, the log also stores information describing whether the target device was vulnerable to the attack.

A real-time status database according to the present invention has many other applications as well. In some embodiments, the database 146 is made available to an administrative console running on security server 135 or other administrative terminal. When a vulnerability is newly discovered in software that exists in subnet 130, administrators can immediately see whether any devices in subnet 130 are vulnerable to it, and if so, which ones. If a means of remediation of the vulnerability is known, the remediation can be selectively applied to only those devices subject to the vulnerability.

In some embodiments, the database 146 is integrated into another device, such as firewall 131 or router 133, or an individual device on the network. While some of these embodiments might avoid some failures due to network instability, they substantially increase the complexity of the device itself. For this reason, as well as the complexity of maintaining security database functions when integrated with other functions, the network-attached device embodiment described above in relation to FIGS. 1-4 is preferred.

In a preferred embodiment, a software development kit (SDK) allows programmers to develop security applications that access the data collected in database 146. The applications developed with the SDK access information using a defined application programming interface (API) to retrieve vulnerability, remediation, and device status information available to the system. The applications then make security-related determinations and are enabled to take certain actions based on the available data.

In the preferred embodiment, database 146 includes vulnerability and remediation information such that, for at least one vulnerability, multiple methods of remediating the vulnerability are specified. When the system has occasion to implement or offer remediation of a vulnerability, all known alternatives are presented that are relevant to the device or machine's particular configuration or setup. For example, when a vulnerability of a device is presented to an administrator, the administrator is given a choice among the plurality of remediation options to remediate the vulnerability. In some embodiments, the administrator can select a preferred type of remediation that will be applied if available and a fallback type. For example, an administrator may select application of a policy setting over installation of a software patch, so that the risk of disruption of critical business systems is minimized.

In other embodiments, an administrator or other user is presented with a set of user interface elements that identify multiple options for remediating and identifying the vulnerability. The administrator or user selects the method to be used, and that remediation is applied to the vulnerable device(s).

All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A system for responding to security vulnerabilities in a system of computing devices, comprising:
  a database associating
    a plurality of device vulnerabilities to which computing devices can be subject, each vulnerability having a vulnerability identifier, with
    a plurality of remediation techniques that collectively remediate the plurality of device vulnerabilities;
  such that:
    each of the device vulnerabilities is associated with at least one remediation technique;
    each remediation technique associated with a particular device vulnerability remediates that particular vulnerability;
    each remediation technique has a remediation type selected from the type group consisting of patch, policy setting, and configuration option; and
    a first one of the device vulnerabilities is associated with at least two alternative remediation techniques;
  a query signal comprising the vulnerability identifier for the first one of the device vulnerabilities;
  a response signal, automatically generated in response to the query signal, that describes the at least two remediation techniques;
  a processor; and
  a memory encoded with programming instructions executable by the processor to:
    receive the response signal;
    select one of the at least two alternative remediation techniques; and
    apply the selected remediation technique.

2. The system of claim 1, further comprising a user interface that:
  offers the at least two alternative remediation techniques for selection by a user;
  accepts a selection by the user of at least one of the at least two alternative remediation techniques; and
  uses the selection to dictate how the processor selects the one of the at least two alternative remediation techniques.

3. The system of claim 1,
  wherein the selecting of one of the at least two alternative remediation techniques is automatic.

4. The system of claim 3, wherein:
  each of the at least two alternative remediation techniques has a remediation type; and
  the automatic selecting is based on the remediation type of each of the at least two alternative remediation techniques.

5. The system of claim 3, wherein the automatic selecting is based on input from a user that is acquired before the response signal is received.

6. The system of claim 3, wherein the automatic selecting is based on input from a user that is acquired after the response signal is received.

7. A method of responding to security vulnerabilities in a system of computing devices, comprising:
  receiving a query signal at a database that associates a plurality of device vulnerabilities to which computing devices can be subject with a plurality of remediation techniques that collectively remediate the plurality of device vulnerabilities, wherein:
  each vulnerability has a vulnerability identifier;
  each vulnerability is associated with at least one remediation technique operable to remediate that particular vulnerability; and
  each remediation technique has a remediation type selected from the group consisting of patch, policy setting, and configuration option;
wherein the query signal comprises the vulnerability identifier for a first device vulnerability;
transmitting a response signal, automatically generated in response to the query signal, that describes at least two alternative remediation techniques associated with the first device vulnerability;
selecting one of the at least two alternative remediation techniques;
applying the selected remediation technique;
offering the at least two alternative remediation techniques for selection by a user via a user interface; and
wherein the selecting step comprises accepting a selection by the user of at least one of the at least two alternative remediation techniques via the user interface.

8. The method of claim 7, wherein the selection by the user occurs before the receiving of the query.

9. A system for responding to security vulnerabilities in a system of computing devices, comprising a processor and a memory, the memory being encoded with a set of programming instructions executable by the processor to manage one or more computing devices by associating in a database:
  a plurality of device vulnerabilities, to which the computing devices can be subject, with
  a plurality of remediation techniques that collectively remediate the plurality of device vulnerabilities,
  wherein:
    each device vulnerability has a vulnerability identifier and is associated in the database with at least one remediation technique;
    each remediation technique has a remediation type selected from the group consisting of patch, policy setting, and configuration option;
    a first one of the device vulnerabilities is associated with at least two alternative remediation techniques;
    a query signal is sent to the device, the query signal comprising the vulnerability identifier for the first one of the device vulnerabilities; and
    a response signal is sent from the device, the response signal being automatically generated in response to the query signal and describing the at least two alternative remediation techniques; and
    the programming instructions are further executable to present a user interface operable to:
      offer the at least two alternative remediation techniques to a user; and
      accept a selection by the user of at least one of the at least two alternative remediation techniques.

10. The system of claim 9, wherein the programming instructions are further executable by the one or more processors to apply the at least one user-selected remediation technique.

11. A system for responding to security vulnerabilities in a system of computing devices, comprising a processor and a memory, the memory being encoded with a set of programming instructions executable by the processor to manage the computing devices by associating in a database:
  a plurality of device vulnerabilities, to which the computing devices can be subject, with
  a plurality of remediation techniques that collectively remediate the plurality of device vulnerabilities,
  wherein:
    each device vulnerability has a vulnerability identifier and is associated in the database with at least one remediation technique;
    each remediation technique has a remediation type selected from the group consisting of patch, policy setting, and configuration option;
    a first one of the device vulnerabilities is associated with at least two alternative remediation techniques;
    a query signal is sent to the device, the query signal comprising the vulnerability identifier for the first one of the device vulnerabilities; and
    a response signal is sent from the device, the response signal being automatically generated in response to the query signal and describing a selected one of the at least two alternative remediation techniques;
    wherein a first computing device includes a processor and a memory encoded with programming instructions executable by the processor to:
      receive the response signal;
      select automatically one of the at least two alternative remediation techniques; and
      apply the selected remediation technique.

12. The system of claim 9, wherein:
  the device automatically selects one of the at least two alternative remediation techniques; and
  the response signal identifies the selected remediation technique.

13. The system of claim 12, wherein the automatic selection is based on a predetermined selection rule provided by a user.

14. A method of responding to security vulnerabilities in a system of computing devices, comprising:
  receiving a query signal at a database that associates a plurality of device vulnerabilities to which computing devices can be subject with a plurality of remediation techniques that collectively remediate the plurality of device vulnerabilities, wherein:
    each vulnerability has a vulnerability identifier;
    each vulnerability is associated with at least one remediation technique operable to remediate that particular vulnerability; and
    each remediation technique has a remediation type selected from the group consisting of patch, policy setting, and configuration option;
  wherein the query signal comprises the vulnerability identifier for a first device vulnerability;
  transmitting a response signal, automatically generated in response to the query signal, that describes at least two alternative remediation techniques associated with the first device vulnerability;
  automatically selecting one of the at least two alternative remediation techniques; and
  applying the selected remediation technique;
  wherein each of the at least two alternative remediation techniques has a remediation type; and
  the automatic selecting is based on the remediation types of the at least two alternative remediation techniques.

15. The method of claim 14, wherein the automatic selecting is further based on input from a user, where the input is received before the receiving of the query.

16. The system of claim 11, wherein:
the device automatically selects one of the at least two alternative remediation techniques; and
the response signal identifies the selected remediation technique.

17. The system of claim 16, wherein the automatic selection is based on a predetermined selection rule provided by a user.

* * * * *